(12) United States Patent
Slocum et al.

(10) Patent No.: US 12,582,958 B1
(45) Date of Patent: *Mar. 24, 2026

(54) CONTROLLING CONTAMINATION IN HYDROGEN PRODUCTION FROM WATER-REACTIVE ALUMINUM

(71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,011

(22) Filed: Sep. 26, 2023

Related U.S. Application Data

(63) Continuation of application No. 17/685,765, filed on Mar. 3, 2022, now Pat. No. 11,772,062, which is a
(Continued)

(51) Int. Cl.
*B01J 7/02* (2006.01)
*B01J 19/00* (2006.01)
(Continued)

(52) U.S. Cl.
CPC ............... *B01J 19/002* (2013.01); *B01J 7/02* (2013.01); *B01J 19/006* (2013.01);
(Continued)

(58) Field of Classification Search
CPC .... B01J 19/002; B01J 19/006; B01J 19/2445; B01J 19/248; B01J 2219/00765;
(Continued)

(56) References Cited

U.S. PATENT DOCUMENTS 1,109,447 A * 9/1914 Messerschmitt .......... C01B 3/10
423/658
1,490,975 A * 4/1924 Howard ................... F02M 1/00
123/445
(Continued)

FOREIGN PATENT DOCUMENTS

EP 2980352 A1 2/2016
GB 2356184 A 5/2001
(Continued)

OTHER PUBLICATIONS

Merouh, Laureen, "Effects of Doping and Microstructural Variables on Hydrogen Generated Via Aluminum-Water Reactions Enabled by a Liquid Metal," Ph.D. Thesis, Massachusetts Institute of Technology, Sep. 2020.
(Continued)

*Primary Examiner* — Lessanework Seifu
(74) *Attorney, Agent, or Firm* — The Marbury Law Group, PLLC

(57) ABSTRACT

A system for controlling contamination in hydrogen production from water-reactive aluminum includes at least one reaction vessel. For example, each reaction vessel may include a container, a conduit, and a plurality of baffles. The container may define a volume, and the conduit may define an orifice outside of the container and spaced away from the container. The plurality of baffles may be disposed in the volume to form a tortuous flow path through the volume to the orifice of the conduit to facilitate rapid production of a large quantity of hydrogen from water-reactive aluminum while reducing the likelihood that ejecta, aerosols, or a combination thereof, may escape the reaction vessel to interfere with end-use of the hydrogen produced.

10 Claims, 11 Drawing Sheets

Related U.S. Application Data continuation of application No. 17/243,528, filed on Apr. 28, 2021, now Pat. No. 11,318,437.

(60) Provisional application No. 63/047,140, filed on Jul. 1, 2020, provisional application No. 63/029,658, filed on May 25, 2020, provisional application No. 63/025,856, filed on May 15, 2020, provisional application No. 63/016,946, filed on Apr. 28, 2020.

(51) Int. Cl.
  *B01J 19/24* (2006.01)
  *C01B 3/10* (2006.01)

(52) U.S. Cl.
  CPC ......... *B01J 19/2445* (2013.01); *B01J 19/248* (2013.01); *C01B 3/10* (2013.01); *B01J 2219/0009* (2013.01); *B01J 2219/00164* (2013.01); *B01J 2219/00765* (2013.01); *B01J 2219/1942* (2013.01); *B01J 2219/1946* (2013.01)

(58) Field of Classification Search
  CPC .... B01J 2219/00777; B01J 2219/00164; B01J 2219/0009; B01J 2219/00162; B01J 2219/00259; B01J 2219/00263; C01B 3/10
  See application file for complete search history.

(56) References Cited

U.S. PATENT DOCUMENTS

| | | | |
|---|---|---|---|
| 2,384,720 A | 9/1945 | Babcock et al. | |
| 3,381,655 A | 5/1968 | Rozzelle | |
| 3,878,081 A | 4/1975 | Reding et al. | |
| 4,134,491 A | 1/1979 | Turillon et al. | |
| 4,264,018 A | 4/1981 | Warren | |
| 4,313,680 A * | 2/1982 | Honnen ............ | B01F 25/31331 |
| | | | 366/337 |
| 4,586,456 A | 5/1986 | Forward | |
| 5,301,631 A | 4/1994 | Vining | |
| 5,372,617 A | 12/1994 | Kerrebrock et al. | |
| 5,494,538 A | 2/1996 | Kirillov et al. | |
| 5,707,499 A | 1/1998 | Joshi et al. | |
| 6,386,137 B1 | 5/2002 | Riche | |
| 6,506,360 B1 | 1/2003 | Andersen et al. | |
| 7,293,511 B2 * | 11/2007 | Prigmore .................. | B09B 3/00 |
| | | | 110/255 |
| 7,364,815 B2 | 4/2008 | Nakagawa et al. | |
| 7,540,892 B2 | 6/2009 | Strizki et al. | |
| 7,666,386 B2 | 2/2010 | Withers-Kirby et al. | |
| 7,803,349 B1 | 9/2010 | Muradov | |
| 8,225,927 B2 | 7/2012 | Narendrnath et al. | |
| 8,418,435 B2 | 4/2013 | Hatoum | |
| 8,974,765 B2 | 3/2015 | Boyle et al. | |
| 9,090,323 B1 | 7/2015 | Ratner | |
| 9,624,103 B1 | 4/2017 | Woodall et al. | |
| 10,745,789 B2 | 8/2020 | Slocum | |
| 11,148,947 B1 | 10/2021 | Slocum et al. | |
| 11,312,466 B1 | 4/2022 | Slocum et al. | |
| 11,318,437 B1 | 5/2022 | Slocum et al. | |
| 11,661,339 B1 | 5/2023 | Mahar et al. | |
| 2002/0088178 A1 | 7/2002 | Davis | |
| 2003/0024323 A1 | 2/2003 | Wang et al. | |
| 2007/0217972 A1 | 9/2007 | Greenberg et al. | |
| 2008/0193806 A1 | 8/2008 | Kulakov | |
| 2010/0028255 A1 | 2/2010 | Hatoum | |
| 2010/0061923 A1 | 3/2010 | Reddy | |
| 2010/0112396 A1 | 5/2010 | Goldstein | |
| 2012/0100443 A1 | 4/2012 | Braithwaite et al. | |
| 2012/0107228 A1 | 5/2012 | Ishida et al. | |
| 2015/0258298 A1 | 9/2015 | Satoh et al. | |
| 2016/0355918 A1 | 12/2016 | Slocum | |
| 2017/0022075 A1 | 1/2017 | Ritchie et al. | |

| | | | |
|---|---|---|---|
| 2017/0022078 A1 | 1/2017 | Fukuoka | |
| 2019/0193913 A1 | 6/2019 | Takehara | |
| 2019/0341637 A1 | 11/2019 | Fine et al. | |
| 2020/0199728 A1 | 6/2020 | Slocum | |
| 2020/0325045 A1 | 10/2020 | Fukuoka | |
| 2021/0061488 A1 | 3/2021 | Smithers et al. | |
| 2021/0276865 A1 | 9/2021 | Meroueh | |
| 2021/0276866 A1 | 9/2021 | Meroueh | |
| 2023/0002026 A1 | 1/2023 | Limpaecher et al. | |

FOREIGN PATENT DOCUMENTS

| | | | |
|---|---|---|---|
| JP | 2004174301 A | 6/2004 | |
| JP | 2004243151 A | 9/2004 | |
| JP | 2009221097 A | 10/2009 | |
| WO | 2009034479 A2 | 3/2009 | |
| WO | 2011040942 A1 | 4/2011 | |
| WO | 2015005921 A1 | 1/2015 | |
| WO | 2015077225 A1 | 5/2015 | |
| WO | 2016196718 A1 | 12/2016 | |
| WO | 202134805 A1 | 2/2021 | |
| WO | 2021119628 A1 | 6/2021 | |

OTHER PUBLICATIONS

Godart, Peter, "Design of an Aluminum-Powered Reverse Osmosis Desalination System for Disaster Relief," Jun. 2019.

Godart, Peter, "Mechanisms of Liquid-Metal-Activated Aluminum-Water Reactions and Their Application," Sep. 2021.

European Patent Office, "Extended European Search Report," issued in related European Patent Application No. 16804381.8 dated Oct. 26, 2018 (7 pages).

U.S. Patent and Trademark Office, "International Preliminary Report on Patentability," issued in related International Patent Application No. PCT/US2016/035397 dated Dec. 5, 2017 (11 pages).

U.S. Patent and Trademark Office, "International Search Report and Written Opinion," issued in related International Patent Application No. PCT/US2016/035397 dated Sep. 7, 2016 (13 pages).

European Patent Office, "International Preliminary Report on Patentability," issued in related International Patent Application No. PCT/US2020/064953 dated May 17, 2022 (10 pages).

European Patent Office, "International Preliminary Report on Patentability," issued in related International Patent Application No. PCT/US2021/037948 dated Feb. 23, 2023 (7 pages).

European Patent Office, "International Search Report and Written Opinion," issued in related International Patent Application No. PCT/US2021/037948 dated Nov. 5, 2021 (28 pages).

European Patent Office, "International Search Report and Written Opinion," issued in related International Patent Application No. PCT/US2020/064953 dated May 25, 2021 (18 pages).

U.S. Patent and Trademark Office, "Notice of Allowance and Issue Fee(s) Due," issued in related U.S. Appl. No. 17/014,593 dated Jun. 3, 2021 (15 pages).

U.S. Patent and Trademark Office, "Notice of Allowance and Issue Fee(s) Due," issued in related U.S. Appl. No. 17/014,593 dated Jan. 22, 2021 (19 pages).

U.S. Patent and Trademark Office, "Non-Final Office Action," issued in related U.S. Appl. No. 16/804,676 dated Jul. 21, 2021 (17 pages).

U.S. Patent and Trademark Office, "Non-Final Office Action," issued in related U.S. Appl. No. 17/488,813 dated Jan. 4, 2024 (34 pages).

U.S. Patent and Trademark Office, "Non-final Office Action," issued in related U.S. Appl. No. 17/487,280 dated Dec. 19, 2022 (51 pages).

U.S. Patent and Trademark Office, "Non-Final Office Action," issued in related U.S. Appl. No. 17/177,144 dated Apr. 12, 2021 (35 pages).

U.S. Patent and Trademark Office, "Non-final Office Action," issued in related U.S. Appl. No. 17/730,475 dated Sep. 1, 2022 (36 pages).

U.S. Patent and Trademark Office, "Restriction Requirement," issued in related U.S. Appl. No. 17/475,320 dated Feb. 1, 2022 (6 pages).

(56) References Cited

OTHER PUBLICATIONS

U.S. Patent and Trademark Office, "Notice of Allowance and Issue Fee(s) Due," issued in related U.S. Appl. No. 17/475,320 dated Mar. 9, 2022 (24 pages).
U.S. Patent and Trademark Office, "Notice of Allowance and Issue Fee(s) Due," issued in related U.S. Appl. No. 17/535,008 dated Dec. 8, 2022 (30 pages).

\* cited by examiner

CONTROLLING CONTAMINATION IN HYDROGEN PRODUCTION FROM WATER-REACTIVE ALUMINUM

CROSS-REFERENCE TO RELATED APPLICATIONS

This application is a continuation of U.S. patent application Ser. No. 17/685,765, filed Mar. 2, 2022, which is a continuation of U.S. patent application Ser. No. 17/243,528 (now issued as U.S. Pat. No. 11,318,437), filed Apr. 28, 2021, which claims priority to U.S. Provisional Patent Application 63/016,946, filed Apr. 28, 2020, to U.S. Provisional Patent Application 63/025,856, filed May 15, 2020, to U.S. Provisional Patent Application 63/029,658, filed May 25, 2020, and to U.S. Provisional Patent Application 63/047, 140, filed Jul. 1, 2020, with the entirety of each of these applications incorporated herein by reference.

BACKGROUND

Under normal environmental conditions, aluminum is covered with a protective oxide coating. This stable oxide coating forms rapidly in air. Thus, although aluminum is reactive with water to produce hydrogen and heat, the oxide coating on aluminum is an obstacle to using aluminum as a source of energy. To overcome the impact of aluminum oxide on the water-reactivity of aluminum, aluminum can be treated to be in an activated form that yields hydrogen and heat when reacted with water.

Activated aluminum is generally robust and easy to handle, making it a useful source of hydrogen across a range of conditions. However, reacting a large amount of activated aluminum with water-such as may be required for rapidly producing a correspondingly large quantity of hydrogen-presents certain challenges. In particular, the reaction of activated aluminum and water is highly exothermic. Thus, in the presence of water, a concentrated mass of activated aluminum can become hot at the center, causing the water to boil. The resulting steam can expand violently. This expansion can break the activated aluminum apart to produce aerosols that can contaminate the gas carried away from the reaction chamber. In extreme cases, the violent expansion of steam can produce ejecta (e.g., from partially activated aluminum and hydroxide) that can damage equipment, such as the reaction vessel itself or the interior of an inflatable structure in fluid communication with the reaction vessel. Conversely, if too much water is present, the reaction of water and activated aluminum may lack enough heat for the reaction to proceed efficiently, thus adding significantly to the time required to produce hydrogen.

Accordingly, there remains a need to react activated aluminum with water to produce large amounts of hydrogen rapidly while controlling contamination associated with excessive temperature.

SUMMARY

According to one aspect, a reaction vessel may include a container having a first end portion and a second end portion, the container defining a volume from the first end portion to the second end portion, a conduit defining an orifice outside of the container and spaced away from the first end portion of the container, and a plurality of baffles disposed, in the volume, away from the second end portion of the container, the conduit in fluid communication with the second end portion of the container via the plurality of baffles, and the plurality of baffles collectively intersecting any longitudinal axis extending through the volume from the first end portion to the second end portion of the container.

In some implementations, one of the plurality of baffles may form at least a portion of a flow restriction having a combined open area, the conduit defines a minimum area, and the combined open area of the flow restriction of the one of the plurality of baffles is about twice the minimum area of the conduit.

In certain implementations, the container and one of the plurality of baffles may define an annular open area therebetween.

In some implementations, at least one of the plurality of baffles may include a respective surface having a radial dimension increasing in a direction from the first end portion toward the second end portion. For example, the one of the plurality of baffles may include a cone having an apex toward the first end portion of the container and a base toward the second end portion of the container. Additionally, or alternatively, one of the plurality of baffles may include a truncated cone having an apex toward the second end portion of the container and a base toward the first end portion of the container.

In certain implementations, at least one baffle of the plurality of baffles may include a chordal cut such that the container and the chordal cut of the at least one baffle define at least a portion of a flow path in the volume between the first end portion and the second end portion of the container.

In some implementations, the plurality of baffles may include a check valve in fluid communication with the orifice of the conduit, and the check valve is biased to a closed position. For example, a portion of the conduit may be disposed in the volume of the container, the check valve is supported on the portion of the conduit in the volume of the container, and the portion of the conduit disposed in the volume defines a plurality of holes in fluid communication between the orifice of the conduit and the second end portion of the container.

In certain implementations, the system may further include a plurality of rods coupled to the plurality of baffles, wherein the plurality of rods restrict movement of the plurality of baffles in a direction from the first end portion toward the second end portion of the container. Additionally or alternatively the system may further include an endplate, wherein the plurality of rods are coupled to the endplate, and the endplate is disposed along the second end portion of the container with a seal between the endplate and the second end portion of the container.

In some implementations, a position of at least one of the plurality of baffles may be adjustable in the volume in a longitudinal direction between the first end portion and the second end portion of the container.

According to another aspect, a rig for preparing an inflatable structure may include a manifold including a junction and a plurality of runners, the plurality of runners in fluid communication with one another and releasably securable in fluid communication with a plurality of reaction vessels, a connector in fluid communication with the plurality of runners via the junction, the connector defining a connection axis, and the connector releasably securable in fluid communication with the inflatable structure along the connection axis, and a truss coupled to the manifold, the truss disposed about the connector to restrict movement of the inflatable structure laterally relative to the connection axis while the inflatable structure is releasably secured in fluid communication with the connector.

In some implementations, the plurality of runners of the manifold may be spaced relative to one another such that the plurality of runners are releasably securable in fluid communication with standard-sized 55-gallon drums adjacent to one another.

In certain implementations, the plurality of runners may be releasably securable to the plurality of reaction vessels with the plurality of runners supporting the manifold away from the plurality of reaction vessels in an orientation with the connector facing away from the plurality of reaction vessels.

In some implementations, the connector may include an O-ring positionable about a rigid inlet of an inflatable structure through an interference fit.

In certain implementations, the truss may include one or more cannisters, each of the one or more cannisters coupled to a respective one of the plurality of runners, and each of the one or more cannisters is operable to direct water-reactive material to the respective one of the plurality of runners.

According to yet another aspect, a reaction vessel may include a container having a first end portion and a second end portion, the container defining a volume from the first end portion to the second end portion, a conduit defining an orifice, at least a portion of the conduit extending outside of the container with the orifice spaced away from the first end portion of the container, a cannister defining a fluid-tight compartment, the cannister actuatable to release a water-reactive material from the fluid-tight compartment into the volume, via the orifice, a condenser including a plurality of coils about the container, the condenser in fluid communication with the volume of the container via the conduit, and a float valve arranged relative to the condenser to receive condensation from the plurality of coils.

In certain implementations, the cannister may include a vibration element actuatable to vibrate the fluid-tight compartment as the cannister is actuated to release the water-reactive material from the fluid-tight compartment.

In some implementations, the reaction vessel may further include a shroud and an air mover, wherein the shroud circumscribes at least a portion of the plurality of coils, and the air mover is arranged to move air over the plurality of coils in a space between the shroud and the container.

In certain implementations, the reaction vessel may further include an auxiliary tank and a heat exchanger, wherein the auxiliary tank is selectively actuatable to direct pressurized hydrogen from the auxiliary tank, and the auxiliary tank is in thermal communication with the plurality of coils via the heat exchanger.

BRIEF DESCRIPTION OF THE FIGURES

Like reference symbols in the various drawings indicate like elements.

DETAILED DESCRIPTION

Figure 1A:
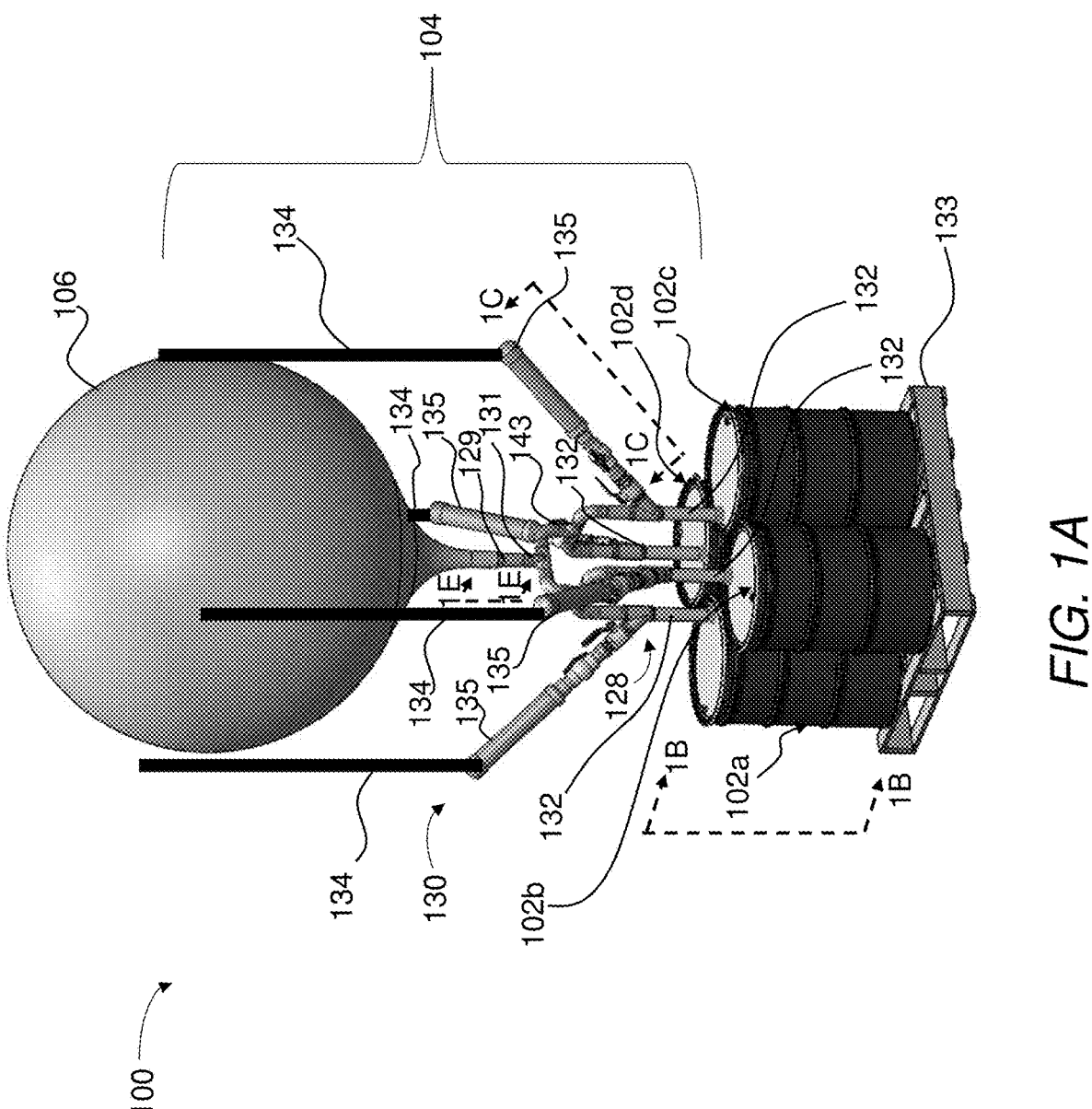
FIG. 1A is a schematic representation of a system including a plurality of reaction vessels, a rig, and an inflatable structure, with the rig coupling the plurality of reaction vessels coupled to one another to direct lifting gas to the inflatable structure.
Figure 1B:
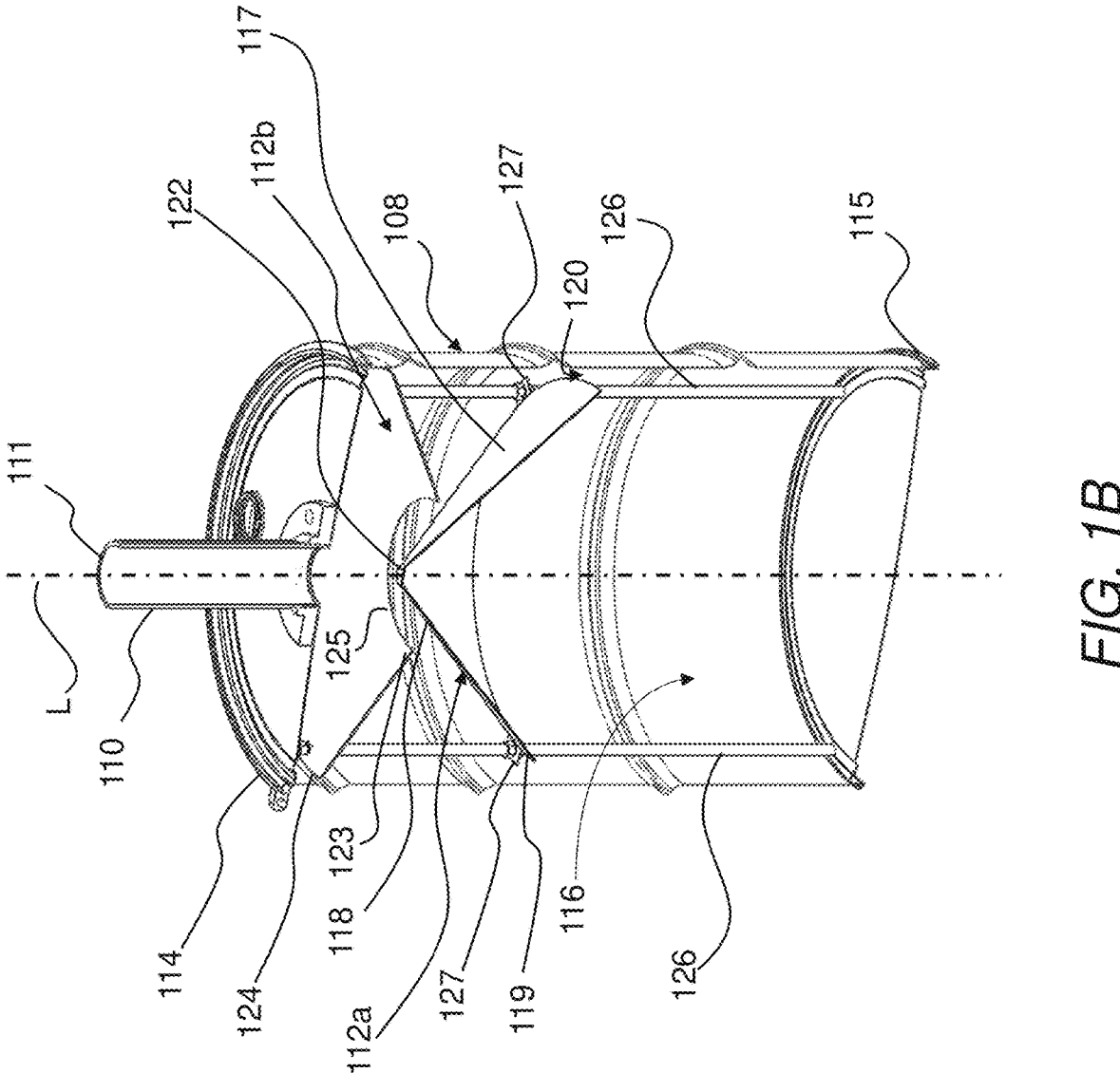
FIG. 1B is a side view of cross-section of one of the plurality of reaction vessels of FIG. 1A, the cross-section taken along the line 1B-1B in FIG. 1A.
Figure 1C:
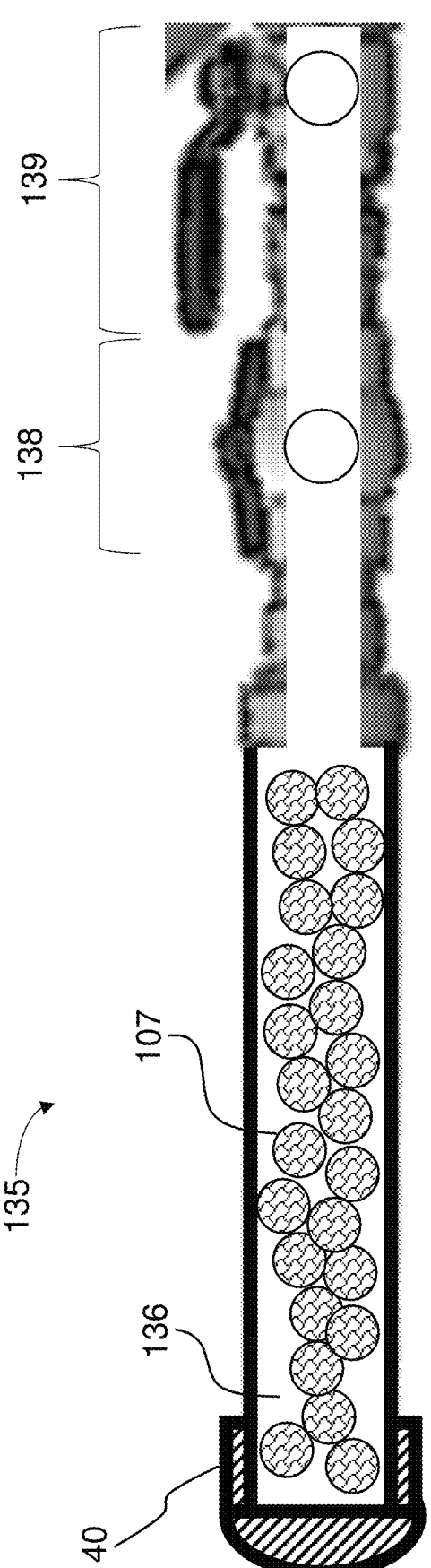
FIG. 1C is a side view of a cross-section of a cannister forming a portion of a truss of the rig of FIG. 1A, the cross-section taken along the line 1C-1C in FIG. 1A.
Figure 1D:
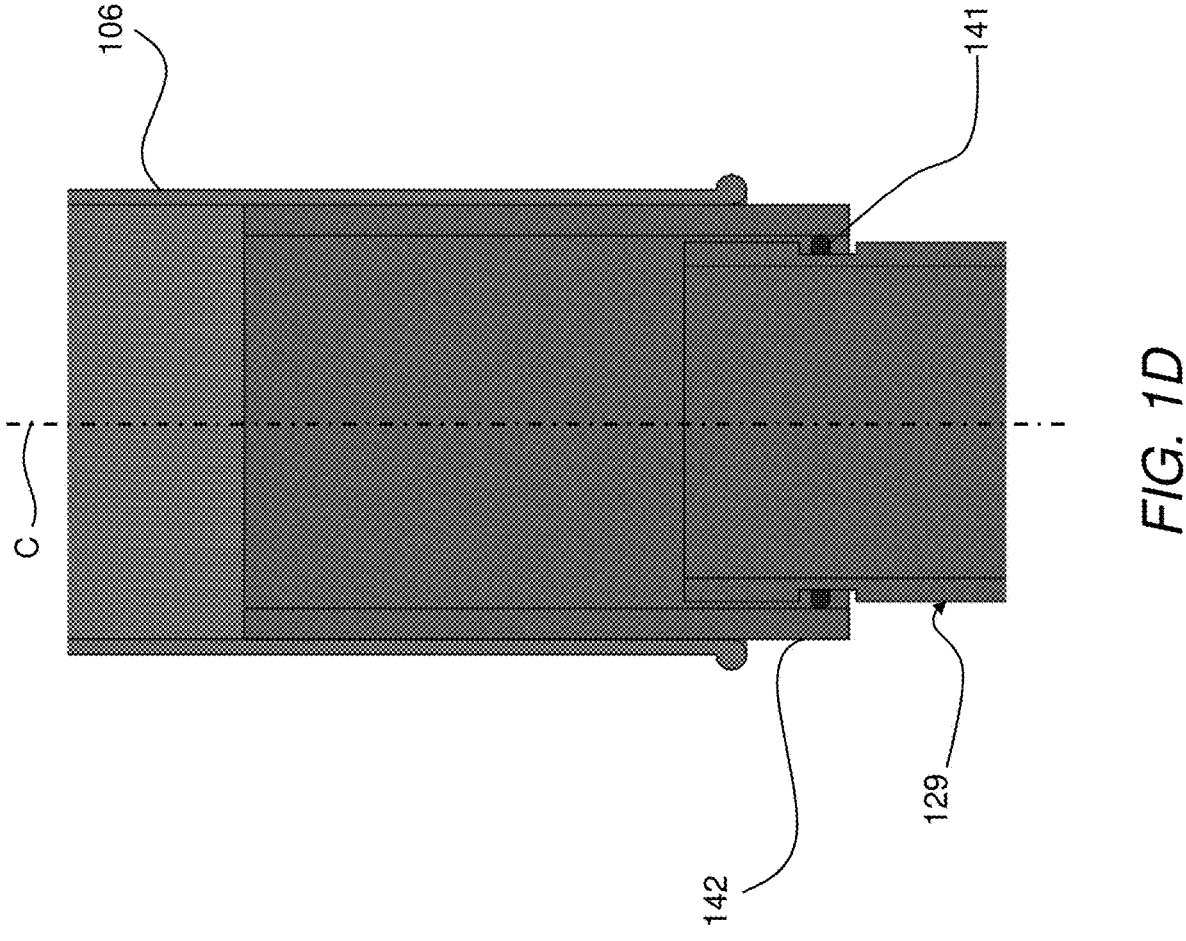
FIG. 1D is a side view cross-section of a connector of the rig of FIG. 1A, the cross-section taken along line 1D-1D in FIG. 1A.

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

Using activated aluminum as a source of hydrogen can present challenges in applications in which it is necessary or desirable to form large quantities of hydrogen rapidly. More specifically, conditions that result in rapidly producing of large amounts of hydrogen from water-reactive aluminum may also be associated with contaminants or other degradation modes that can impair the end use of the hydrogen being produced. Accordingly, devices, systems, and methods described herein are generally directed to decoupling hydrogen production from modes of contamination, thus facilitating rapid production of large quantities hydrogen while mitigating the production of contaminants having the potential to impair equipment and/or an end-use application.

In the description that follows, the end-use application of hydrogen-containing gas produced from water-reactive aluminum is described in the context of a lifting gas provided to an inflatable structure. It shall be appreciated that such an inflatable structure may include any one or more of various different manned or unmanned craft, dirigible or non-dirigible craft, independently propelled or floating craft, rigid or nonrigid craft, tethered or untethered craft, or combinations thereof. Some examples of inflatable structures, therefore, may include, but are not limited to any manner and form of aerostats, balloons, or other rigid, semi-rigid, or non-rigid inflatable structures. It shall be further appreciated that other end-uses of the hydrogen-containing gas are additionally or alternatively possible, with such end uses including any application of hydrogen. Thus, by way of example and not limitation, end-uses of hydrogen-containing gas produced according to any one or more of the various different devices, systems, and methods described herein may additionally, or alternatively, include use in fuel cells, internal combustion engines, and/or any other applications of hydrogen in field conditions.

As used herein, the terms "activated aluminum," "aluminum in an activated form," "water-reactive aluminum," and "water-reactive material" shall be understood to be interchangeable with one another, unless otherwise specified or made clear from the context, with the different terms being used as appropriate to facilitate readability in different contexts. Further, unless a contrary intent is indicated, each of these terms shall be understood to include any manner and form of aluminum that may produce hydrogen upon exposure to water, with or without the addition of additional materials. Some examples of activated aluminum useable herein are set forth in U.S. Pat. No. 10,745,789, issued to Jonathan Thurston Slocum on Aug. 18, 2020, and entitled "Activated Aluminum Fuel," the entire contents of which are hereby incorporated herein.

For the sake of clear and efficient description, elements having numbers having the same last two digits in the disclosure that follows shall be understood to be analogous to or interchangeable with one another, unless otherwise explicitly made clear from the context, and, therefore, are not described separately from one another, except to note differences or to emphasize certain features.

Referring now to FIGS. 1A-1D, a system 100 for controlling contamination in hydrogen production from water-reactive aluminum may include a plurality of reaction vessels 102a,b,c,d (referred to collectively as the plurality of reaction vessels 102a,b,c,d and individually referred to as a first reaction vessel 102a, a second reaction vessel 102b, a third reaction vessel 102c, and a fourth reaction vessel 102d), a rig 104, and an inflatable structure 106. The inflatable structure 106 may be in fluid communication with the plurality of reaction vessels 102a,b,c,d via the rig 104. As described in greater detail below, the rig 104 may restrict unintended movement of the inflatable structure 106 prior to release from the rig 104, thus reducing the likelihood of kinking that may compromise inflation of the inflatable structure 106 in windy conditions.

In use, as also described in greater detail below, discrete objects 107 including activated aluminum may be directed from the rig 104 into each one of the plurality of reaction vessels 102a,b,c,d. Water may be added to each one of the plurality of reaction vessels 102a,b,c,d to react with the activated aluminum of the discrete objects 107 in the respective one of the plurality of reaction vessels 102a,b,c,d. As water reacts with the activated aluminum, hydrogen and steam may be produced in each one of the plurality of reaction vessels 102a,b,c,d. The rig 104 may combine the gaseous flows from the plurality of reaction vessels 102a, b,c,d and direct the combined gaseous flow into the inflatable structure 106. That is, the rig 104 may decouple the volume of lifting gas required for the inflatable structure 106 from the size of any individual one of the plurality of reaction vessels 102a,b,c,d. Such decoupling may, for example, facilitate forming each one of the plurality of reaction vessels 102a,b,c,d within a size envelope of a standardized containers (e.g., 55-gallon drums). As also described in greater detail below, each one of the plurality of reaction vessels 102a,b,c,d may include hardware that, even under variable conditions associated with many field applications, facilitates robust control of one or more contaminants (e.g., aerosolized material, ejecta, and/or water content) while hydrogen-containing gas is rapidly formed from activated aluminum in each one of the plurality of reaction vessels 102a,b,c,d. Thus, distributing hydrogen production among the plurality of reaction vessels 102a,b,c,d and combining the resulting flows in the rig 104 may advantageously decouple the volume of hydrogen-containing gas to the inflatable structure 106 from local conditions useful for controlling contaminants. Stated differently, distributed hydrogen production in the plurality of reaction vessels 102a,b,c,d and combining such hydrogen in the rig 104 supporting the inflatable structure 106 may facilitate providing a large volume of hydrogen to meet inflation rate and volume requirements of the inflatable structure 106 while offering a degree of protection to the inflatable structure 106 from contaminants and/or unintended movements that may damage the inflatable structure 106.

Each one of the plurality of reaction vessels 102a,b,c,d may be identical to one another to facilitate, among other things, interchangeability of components in the field and predictable scalability to meet hydrogen production demands of a particular mission. Thus, for the sake of clear and efficient explanation, the first reaction vessel 102a is described below in detail. Unless otherwise specified or made clear from the context, the second reaction vessel 102b, the third reaction vessel 102c, and the fourth reaction vessel 102d may include features analogous to those described below with respect to the first reaction vessel 102a. Further, while the plurality of reaction vessels 102a, b,c,d are described as including four instances of reaction vessels, it shall be appreciated that the system 100 may include additional reaction vessels in some cases or fewer reaction vessels in other cases. Thus, in some implementations, the system 100 may include only the first reaction vessel 102a.

The first reaction vessel 102a may include a container 108, a conduit 110, and a plurality of baffles 112a,b (collectively referred to as the plurality of baffles 112a,b and individually referred to as a first baffle 112a and a second baffle 112b). The container 108 may have a first end portion 114 and a second end portion 115, with the container defining a volume 116 therebetween. The conduit 110 may define an orifice 111 outside of the container 108 and spaced away from the first end portion 114 of the container 108. The orifice 111 may be in fluid communication with the volume 116. The plurality of baffles 112*a,b* may be disposed, in the volume 116, away from the second end portion 115 of the container 108 such that activated aluminum may react with water along the second end portion 115 of the container 108 and the spacing between the second end portion 115 of the container 108 and the plurality of baffles 112*a,b* may accommodate hydroxide byproduct away from the plurality of baffles 112*a,b* to reduce the likelihood of degradation of the plurality of baffles 112*a,b* through successive uses.

In general, the conduit 110 may be in fluid communication with the second end portion 115 of the container 108 via the plurality of baffles 112*a,b* such that the plurality of baffles 112*a,b* alone, or in combination with the container 108, define a tortuous flow path from the second end portion 115 to the conduit 110. For example, the plurality of baffles 112*a,b* may be arranged relative to one another such that the plurality of baffles 112*a,b* collectively intersect any instance of a longitudinal axis "L" extending through the volume 116 from the first end portion 114 to the second end portion 115 of the container 108. For the sake of illustration, the longitudinal axis "L" is depicted as centered in the volume 116. However, it shall be appreciated that, at any position parallel to the position of the longitudinal axis "L" depicted in the volume 116, the longitudinal axis "L" intersects the plurality of baffles 112*a,b*. Stated differently, all material moving between the conduit 110 and the second end portion 115 of the container 108 in the volume 116 may be deflected by at least a portion of the plurality of baffles 112*a,b*. For example, as the discrete objects 107 and water are directed into the volume 116 via the conduit 110, the discrete objects 107 and water may be dispersed by the plurality of baffles 112*a,b*. As compared to a reaction vessel without baffling, the dispersal of the discrete objections 107 and water by the plurality of baffles 112*a,b* may reduce the likelihood of creating hot spots and incomplete early reactions. Additionally, or alternatively, the plurality of baffles 112*a,b* may deflect rising steam and aerosolized particles moving, in the volume 116, from the second end portion 115 toward the conduit 110. Such deflection may result in swirl or other non-linear flow of the steam and aerosolized particles in the volume 116, providing additional residence time of water molecules (as steam) and activated aluminum particles (as aerosolized material) to react to completion in the volume 116, thus reducing the likelihood of solids exiting the reaction vessel 102*a* via the conduit 110. Further, or instead, with the plurality of baffles 112*a,b*, arranged relative to one another to intersect any longitudinal axis (e.g., the longitudinal axis "L") extending, in the volume, from the first end portion 114 to the second end portion 115 of the container 108, the plurality of baffles 112*a,b* reduce the likelihood that ejecta formed along the second end portion 115 of the container 108 may escape from the container 108 to damage other equipment (e.g., the inflatable structure 106).

In certain implementations, the tortuous path at least partially defined by the plurality of baffles 112*a,b* may be sized to have a flow restriction relative to a minimum area of the conduit 110. As an example, one of the plurality of baffles 112*a,b* may form at least a portion of a flow restriction having a combined open area that is about twice the minimum area of the conduit 110, such as may be useful for achieving an appropriate residence time of steam and aerosolized material (including activated aluminum) in the volume 116 without creating a pressure drop that would substantially hinder the flow of gases out of the reaction vessel

102*a* via the conduit 110. As used in this context, the term "about" shall be understood to account for small variations attributable to dimensional tolerance of hardware and/or small restrictions associated with features (e.g., tabs as described below) used to support the given one of the plurality of baffles 112*a,b*. Thus, for example, the combined open area of the flow restriction of one of the plurality of baffles 112*a,b* that is about twice the minimum area of the conduit 110 may include a ratio greater than 1.5:1 and less than 2.5:1.

In some implementations, the first baffle 112*a* may include a surface 117 having a radial dimension increasing in a direction from the first end portion 114 toward the second end portion 115 such that reactants (e.g., the discrete objects 107 and water) introduced into the volume 116 via the conduit 110 may be deflected by the surface 117 toward a periphery of the container 108. Such dispersion of the reactants introduced into the volume 116 may reduce the likelihood of hotspots that contribute to incomplete reaction. As an example, the first baffle 112*a* may include a cone having an apex portion 118 toward the first end portion 114 of the container 108 and a base portion 119 toward the second end portion 115 of the container 108. So oriented, the base portion 119 of the first baffle 112*a* and the container 108 may define an annular region 120 therebetween, with the annular region 120 sized at least to allow the discrete objects 107 to move past the first baffle 112*a* to a portion of the volume 116 alone the second end portion 115 of the container 108. As a more specific example, in instances in which the container 108 is a standard 55-gallon drum, the first baffle 112*a* may include a right circular cone having a height of about 9.5 inches and the base portion 119 may have a diameter of about 20 inches. The approximation of dimensions in this context allows for typical dimensional tolerances in fabrication using thin material such as sheet metal. With such dimensions, the annular region 120 defined between the base portion 119 of the first baffle 112*a* and the container 108 may have a width of about 1 inch (e.g., greater than 0.5 inches and less than 1.5 inches), again allowing for typical dimensional tolerances. While the first baffle 112*a* may include geometric right circular cone in some instances, it shall be appreciated that the first baffle 112*a* may alternatively include a truncated right circular cone having a cap 122 along the apex portion 118, as may be useful for facilitating fabrication of the first baffle 112*a*.

In certain implementations, the second baffle 112*b* may include a truncated cone (e.g., a truncated right circular cone) having an apex portion 123 toward the second end portion 115 of the container 108 and a base portion 124 toward the first end portion 114 of the container 108. More specifically, the truncated cone may be hollow, with the apex portion 123 of the second baffle 112*b* defining a passage 125 through which material may move from the conduit 110 toward the surface 117 of the first baffle 112*a*, and through which hydrogen-containing gas may flow, in the volume 116, in a direction from the second end portion 115 of the container 108 to the conduit 110. For example, in instances in which the first baffle 112*a* includes a cone as described above, the first baffle 112*a* and the second baffle 112*b* may be positioned relative to one another (e.g., centered relative to one another) such that material moving through the second baffle 112*b* is funneled toward the apex portion 118 of the first baffle 112*a*.

While the first baffle 112*a* and the second baffle 112*b* have been described as including conical shapes, it shall be appreciated that other shapes of the first baffle 112*a* and the second baffle 112 are additionally or alternatively possible, such as may be useful for more cost-effective manufacturing. For example, in some instances the first baffle 112a may include a V-shape and/or a pyramid shape, with the apex of each shape toward the first end portion 114 of the container 108. Additionally, or alternatively, the second baffle 112b may include analogous shapes, with a passage therethrough, and the apex of each shape toward the second end portion 115 of the container 108. Further, or instead, while the second baffle 112b has been described as having a three-dimensional shape, it shall be appreciated that the second baffle 112b may be a flat plate, defining one or more orifices, in some instances. It shall be appreciated that such a flat plate may be more cost-effective to fabricate than three-dimensional shapes, while providing a flow pattern within the volume 116 sufficient for activated aluminum formulations that may be slow reacting. Still further, or instead, while the plurality of baffles 112a,b have been described as including the first baffle 112a and the second baffle 112b, it shall be appreciated that this is for the sake of clear and efficient description, and the plurality of baffles 112a,b may include additional baffles as may be necessary or useful to achieve suitable steam and hydrogen flow from the reaction vessel 102a with a tolerable amount of aerosolized solids in the gaseous flow moving toward the inflatable structure 106.

To facilitate stable and accurate placement of the plurality of baffles 112a,b in the volume 116 of the container 108, the reaction vessel 102a may include a plurality of rods 126 coupled to the first baffle 112a and/or the second baffle 112b, with such coupling restricting movement of the first baffle 112a and/or the second baffle 112b, as the case may be, at least a direction in the volume 116 from the first end portion 114 toward the second end portion 115 of the container 108. Stated differently, the plurality of rods 126 may restrict movement of the first baffle 112a and the second baffle 112b at least in a longitudinal direction relative to one another in the volume 116 to maintain integrity of a flow path from the conduit 110 toward the portion of the volume 116 along the second end portion 115 of the container 108 while also maintaining the plurality of baffles 112a,b spaced away from the second end portion 115 of the container 108 to reduce the likelihood of interference with reaction of activated aluminum along the second end portion 115 of the container 108 during use. In certain implementations, the plurality of rods 126 includes at least three rods to allow for kinematic support, thus reducing the likelihood of rocking. Additionally, or alternatively, each one of the plurality of rods 126 may be threaded, and nuts may be used to set, adjust, and clamp the height of one or more of the plurality of baffles 112a,b.

While the first baffle 112a and/or the second baffle 112b may be fixedly coupled to the plurality of rods 126 in some instances, it shall be appreciated that at least one of the plurality of rods 126 may be adjustable in the volume 116 in a longitudinal direction between the first end portion 114 and the second end portion 115 of the container 108, as may be useful for adjusting the size of the flow path to account for variations in conditions in the field. For example, one or more of the plurality of baffles 112a,b may be moved longitudinally along the plurality of rods 126 to reduce the amount of ejecta ejected from the volume 116 into the conduit 110.

In certain implementations, the plurality of rods 126 may extend from the first end portion 114 of the container to the second end portion 115 of the container such that the axial length of each one of the plurality of rods 126 matches an axial dimension of the volume 116 and the plurality of rods 126 may remain in place through an interference fit, without the use of other fastening to the container 108. Such an interference fit may be useful, for example, for installing and removing the plurality of baffles 112a,b and the plurality of rods 126 as a single unit, without the use of specialized tools, as may be useful in field applications. Additionally, or alternatively, the first baffle 112a may include a plurality of tabs 127 to which the plurality of rods 126 may be coupled to hold the first baffle 112a in place away from the second end portion 115 of the container 108. Further, or instead, the outer diameter of the base portion 124 of the second baffle 112b may be approximately equal to the inner diameter of the container 108, with spacing allowing the second baffle 112b to be slid into and out of place in the volume 116 of the container 108. With the outer diameter of the base portion 124 of the second baffle 112b spanning the radial extent of the volume 116 of the container 108, the plurality of rods 126 may be attached to (e.g., by extending through) the second baffle 112b along the base portion 124 of the second baffle 112b.

In general, the container 108 may be any one or more of various different types of containers having sufficient volume to accommodate reactants and products associated with forming hydrogen from water-reactive aluminum while being formed of material capable of withstanding temperatures and pressures associated with such reactions. Steel is one such material, which has the advantage of being rigid to significant pressures. However, in some instances, the container 108 may be flexible (e.g. a flexible bag reaction chamber) such that the container 108 may be expandable. Further, or instead, the container 108 may be any one or more of various different types of standardized containers used across a variety of industrial applications and, thus, cost-effective. As a particularly useful implementation, the container 108 may be a standard 55-gallon drum, which are ubiquitous and, thus, readily sourced. Given that the container 108 may represent a significant amount of the size of the system 100, the ability to source the container 108 at or near the location of use of the system 100 may offer significant logistical advantages.

In certain implementations, the container 108 may include a single opening, through which the conduit 110 may be in fluid communication with the volume 116 of the container 108 for both the introduction of reactants and the outlet of hydrogen-containing gas. As compared to the use of multiple openings, a single opening in the container 108 may be useful, for example, for aligning the plurality of reaction vessels 102a,b,c,d with the rig 104. Facilitating alignment in this way may be particularly useful in implementations in which each one of the plurality of reaction vessels 102a,b, c,d is heavy and, thus, not amenable to tightly controlled adjustments.

While the container 108 may have any one or more of various different shapes, the volume 116 defined by the container 108 may be advantageously symmetric about the longitudinal axis "L" in some instances. This type of symmetry may, for example, reduce the likelihood of uneven distribution of reactants in the volume 116. Further, or instead, symmetry about the longitudinal axis "L" may facilitate uniform flow of the hydrogen-containing gas toward the conduit 110 which, in turn, may facilitate complete reaction of steam and aerosolized particles of activated aluminum within the residence time of such reactants in the volume 116. As an example of a symmetric shape, the container 108 may have a cylindrical inner and outer shape, with a 55-gallon drum being one of several examples.

The conduit 110 may be rigid such that the orifice 111 defined by the conduit 110 remains a constant shape while being supported away from the first end portion 114 of the container 108 in a consistent position, thus facilitating coupling the reaction vessel 102a to the rig 104. Additionally, or alternatively, the conduit 110 may define a straight flow path from the orifice 111 to the volume 116 such that pressure drop across the conduit 110 may be minimal and contaminants are unlikely to settle in the conduit 110. As an example, the conduit 110 may be formed of polyvinyl chloride (PVC) tubing, which is ubiquitous and readily sourced.

In general, the rig 104 may include a manifold 128, a connector 129, and a truss 130. The manifold 128 may include a junction 131 and a plurality of runners 132. The plurality of runners 132 may be in fluid communication with one another, and each one of the plurality of runners 132 may be releasably securable in fluid communication with a respective one of the plurality of reaction vessels 102a,b,c,d. The connector 129 may be in fluid communication with the plurality of runners 132 via the junction 131. The connector 129 may define a connection axis "C," and the connector 129 may be releasably securable in fluid communication with the inflatable structure 106 along the connection axis "C." The truss 130 may be coupled to the manifold 128 to restrict movement of the inflatable structure 106 to reduce the likelihood of kinking the inflatable structure 106 in windy conditions as the inflatable structure 106 is inflated with hydrogen-containing gas from the plurality of reaction vessels 102a,b,c,d. For example, the truss 130 may be disposed about the connector 129 to restrict movement of the inflatable structure laterally relative to the connection axis "C," while the inflatable structure 106 is releasably secured in fluid communication with the connector 129. As compared to the use of a single large reaction vessel that may be difficult to control, the rig 104 may facilitate distributing production of a large quantity of hydrogen among the plurality of reaction vessels 102a,b,c,d, each of which is easier to control with respect to contaminants. Thus, the rig 104 advantageously decouples challenges associated with controlling contaminants while producing a large volume of hydrogen-containing gas from water-reactive aluminum. Further, to facilitate directing hydrogen to the inflatable structure 106 sized to receive the large quantity of hydrogen producible by the system 100, the rig 104 may additionally, or alternatively, restrict movement of the inflatable structure 106 to reduce the likelihood of kinking or other damage that may interfere with delivery of the large quantity of hydrogen from the plurality of reaction vessels 102a,b,c,d to the inflatable structure 106.

The manifold 128 may generally combine flows from the plurality of runners 132 into a single flow at the junction 131 in fluid communication with the inflatable structure 106 via the connector 129. More specifically, the manifold 128 may include a series of rigid couplings (e.g., a combination of rigid pipe and rigid couplings, such as rigid couplings available from Victaulic® of Easton, PA) such that the manifold 128 may support the manifold away from the plurality of reaction vessels 102a,b,c,d in an orientation with the connector 129 facing away from the plurality of the reaction vessels 102a,b,c,d such that the inflatable structure 106 may expand away from the plurality of reaction vessels 102a,b,c,d, as may be desirable to reduce exposure of the inflatable structure 106 to surface temperatures of the plurality of reaction vessels 102a,b,c,d. While the manifold 128 and the truss 130 are shown as supporting the inflatable structure 106 with the connection axis "C" parallel to the longitudinal axes of the plurality of reaction vessels 102a, b,c,d, it shall be understood that the manifold 128 and the truss 130 may additionally or alternatively support the inflatable structure 106 in an orientation with the connection axis "C" non-parallel (e.g., perpendicular) to the longitudinal axes of the plurality of reaction vessels 102a,b,c,d.

As an example, the plurality of runners 132 may be spaced relative to one another such that the plurality of runners 132 may be releasably securable in fluid communication with the plurality of reaction vessels 102a,b,c,d adjacent to one another to facilitate operating the system 100 within an efficient footprint (e.g., on a pallet 133 of a standard size that may be moved using a fork lift of similar equipment). In this context, the term "adjacent" shall be understood to include any orientation of the plurality of reaction vessels 102a,b,c,d in which each one of the plurality of reaction vessels 102a,b,c,d is in contact with at least another one of the plurality of reaction vessels 102a,b,c,d. For example, returning to the implementation in which the container 108 of each one of the plurality of reaction vessels 102a,b,c,d is a standard-sized 55 gallon drum and the conduit 110 is a straight piece of tubing extending from the standard 2 inch fitting on the lid of each 55 gallon drum, the plurality of runners 132 may be spaced relative to one another according to the spacing of the standard 2 inch fitting on the lid of each 55-gallon drum when the 55-gallon drums are arranged adjacent to one another on the pallet 133.

In general, the truss 130 may include any combination of a plurality of supports 134 spaced apart from one another to define a size envelope accommodating the inflation structure 106 filled to maximum inflation capacity while restricting unintended movement of the inflation structure 106 at maximum inflation capacity. In some instances, it may be useful to support the inflation structure 106 using an arrangement of the plurality of supports 134 that facilitates setting up and breaking down the system 100 in the field. Thus, for example, the plurality of supports 134 may correspond in number to the plurality of reaction vessels 102a,b,c,d such that each one of the plurality of reaction vessels 102a,b,c, d—which may be the heaviest component in the system 100—may serve as an anchor to the position of a corresponding one of the plurality of supports 134. Additionally, or alternatively, the plurality of supports 134 may be separate from one another such that each one of the plurality of supports 134 may flex independently of each of the other ones of the plurality of supports 134 to accommodate some amount of movement of the inflatable structure 106 as the inflatable structure 106 expands during inflation.

In certain implementations, the truss 130 may include a plurality of cannisters 135 collectively operable to deliver activated aluminum into the plurality of reaction vessels 102a,b,c,d for the production of hydrogen according to the techniques described herein. For example, each one of the plurality of supports 134 may be coupled to a respective one of the plurality of cannisters 135 such that each instance of the plurality of cannisters 135 serve dual purposes of delivering fuel to the plurality of reaction vessels 102a,b,c,d while supporting the plurality of supports 134 spaced apart from one another to accommodate the inflatable structure 106 therebetween. As compared to the use of separate reactant delivery and support structure, such dual functionality of the plurality of cannisters 135 may facilitate efficiently setting up and breaking down the system 100 in the field.

Each one of the plurality of cannisters 135 may be coupled to a respective one of the plurality of runners 132, and each one of the plurality of cannisters 135 may define a compartment 136. The discrete objects 107 may be stored in the compartment 136 of each one of the plurality of cannisters 135. For example, the compartment 136 may be fluid-tight to reduce the likelihood of prematurely fouling activated aluminum of the discrete objects 107 prior to delivery to the plurality of reaction vessels 102*a,b,c,d*. As used in this context, fluid-tight shall be understood to include sealing the compartment 136 using one or more instances of a first valve 138 such that closing the first valve 138 may decouple fluid communication between the compartment 136 and a respective one of the plurality of runners 132. Similarly, opening the first valve 138 of a given one of the plurality of cannisters 135 may allow the discrete objects 107 in the compartment 136 of each one of the plurality of cannisters 135 to flow into the respective one of the plurality of runners 132 associated with the given cannister and, ultimately, into the respective one of the plurality of reaction vessels 102*a,b,c,d*. While the first valve 138 may be manually operable to facilitate robust operability in diverse field applications, it shall be appreciated that the first valve 138 may be electrically actuatable in certain instances to facilitate accurate control of reaction parameters.

In certain implementations, each one of the plurality of cannisters 135 be secured to a respective one the plurality of runners 132 with the compartment 136 of the given cannister angled toward the corresponding one of the plurality of reaction vessels 102*a,b,c,d*. That is, once the first valve 138 of a given one of the plurality of cannisters 135 is opened, at least a portion of the discrete objects 107 in the compartment 136 associated with the first valve 138 may, under the force of gravity, flow toward the respective one of the plurality of reaction vessels 102*a,b,c,d* corresponding to the given cannister.

In certain instances, each one of the plurality of cannisters 135 may include a second valve 139 operable in coordination with the first valve 138 to facilitate handling the flow of liquid and solid reactants and the flow of hydrogen-containing gas through the plurality of runners 132. For example, for each one of the plurality of cannisters 135, the first valve 138 may be opened to release the discrete objects 107 as described above. Once the discrete objects 107 have been emptied from a given one of the plurality of cannisters 135, the second valve 139 associated with the given cannister may be closed to make the seals between the plurality of cannisters 135 and the plurality of runners 132 gas-tight such that hydrogen-containing gas may flow only from the plurality of reaction vessels 102*a,b,c,d* into the inflatable structure 106.

Additionally, or alternatively, to facilitate moving the discrete objects 107 from the plurality of cannisters 135 each one of the plurality of cannisters 135 may include a vibration element 140 actuatable to vibrate the compartment 136 as the respective one of the plurality of cannisters 135 is actuated (e.g., by opening the first valve 138) to release the discrete objects 107 containing water-reactive material from the compartment 136. As an example, the vibration element 140 may include an eccentric motor. The vibration element 140 may be used to meter an amount of the discrete objects 107 released from the a given one of the plurality of cannisters 135 to control the rate of reaction—and, thus, the rate of hydrogen and steam flow-in the corresponding one of the plurality of reaction vessels 102*a,b,c,d* associated with the given cannister.

In certain instances, the discrete objects 107 may further, or instead, have a distribution of surface area-to-volume ratios to facilitate controlling the rate of reaction, with larger ratios corresponding to slower reactions and smaller ratios corresponding to faster reactions. The discrete objects 107 may be in the shape of any flowable material, such as one or more of pellets, cylinders, chips, or spheres such as bbs.

In general, the connector 129 may form a fluid-tight seal between the inflatable structure 106 and the junction 131 of the manifold 128. For example, the connector 129 may include an O-ring positionable about a rigid inlet 142 of the inflatable structure 106 through an interference fit. In use, the O-ring may allow the rigid inlet 142 of the inflatable structure 106 to slide from the connector 129 once the inflatable structure 106 has reached a target size for release. That is, the connector 129 may be self-releasing based on a state of inflation of the inflatable structure 106, thus reducing the need for operator monitoring and intervention. As an example, the connector 129 may be a rigid coupling, such as those available from Victaulic® of Easton, PA.

Having described various aspects of the system 100, attention is now directed to operation of the system 100 to inflate the inflatable structure 106 according to an exemplary end-use case.

Initially, a small amount of water (e.g., 1-5 times the amount of the discrete objects 107, on a mass basis) may be combined with the discrete objects 107 (containing activated aluminum) in each one of the plurality of reaction vessels 102*a,b,c,d*. This initial reaction may advantageously cause the discrete objects 107 to react and break apart. However, because the water present during this initial reaction is limited, the initial hot and violent breaking apart of the discrete objects 107 is not expected to create a large volume of steam. The modest amount of steam may aerosolize particles containing activated aluminum. As such aerosolized particles move through the plurality of baffles 112*a,b* in a direction from the second end portion 115 toward the conduit 110, the aerosolized particles may react with the steam to produce hydrogen and hydroxide particles.

After the initial reaction is complete in each one of the plurality of reaction vessels 102*a,b,c,d*, more water (e.g., 10-20 times the amount of the discrete objects 107, on a mass basis) may be added to react the activated aluminum of the discrete objects 107 substantially to completion in each one of the plurality of reaction vessels 102*a,b,c,d*. Additionally, or alternatively, the water added after the initial reaction may be added in bursts (e.g., 2-5 times the amount of the discrete objects 107, on a mass basis) to generate bursts of steam and hydrogen gas.

As a more specific example, 3-6 kg of the discrete objects 107 may be reacted with about 10-20 times (by mass) total water in instances in which the container 108 is a 55-gallon drum. The initial reaction may take about 2 minutes, and the final addition of water may be added at about 2.5 minutes. In such instances, the reaction of the discrete objects 107 has been observed to be 90 percent complete within 5-10 minutes, depending on experimental variables, such as the activated aluminum content of the discrete objects 107.

While certain aspects of reaction vessels have been described, additional or alternative implementations of reaction vessels are additionally or alternatively possible.

Figure 2A:
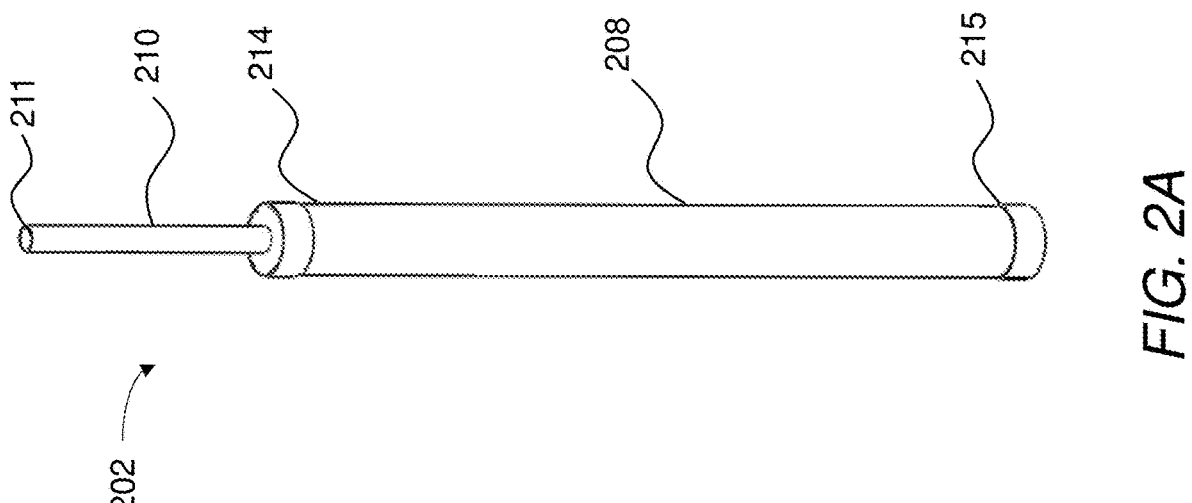
FIG. 2A is a perspective view of a reaction vessel.
Figure 2B:
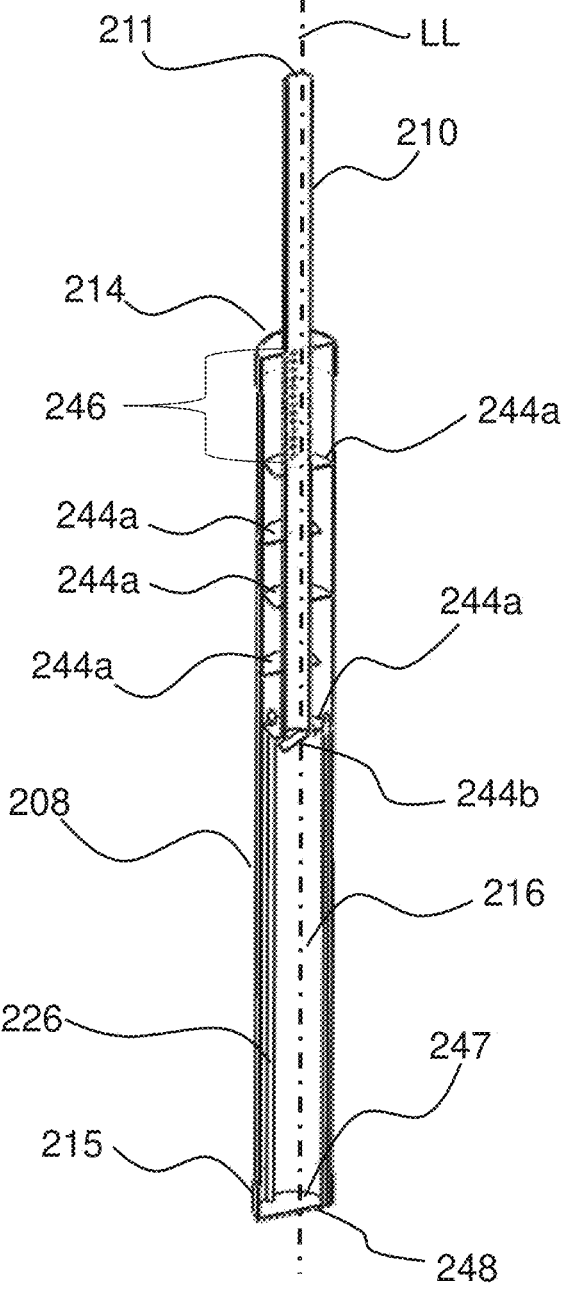
FIG. 2B is a perspective view of a cross-section of the reaction vessel of FIG. 2A, the cross-section taken along the line 2B-2B in FIG. 2A.
Figure 2C:
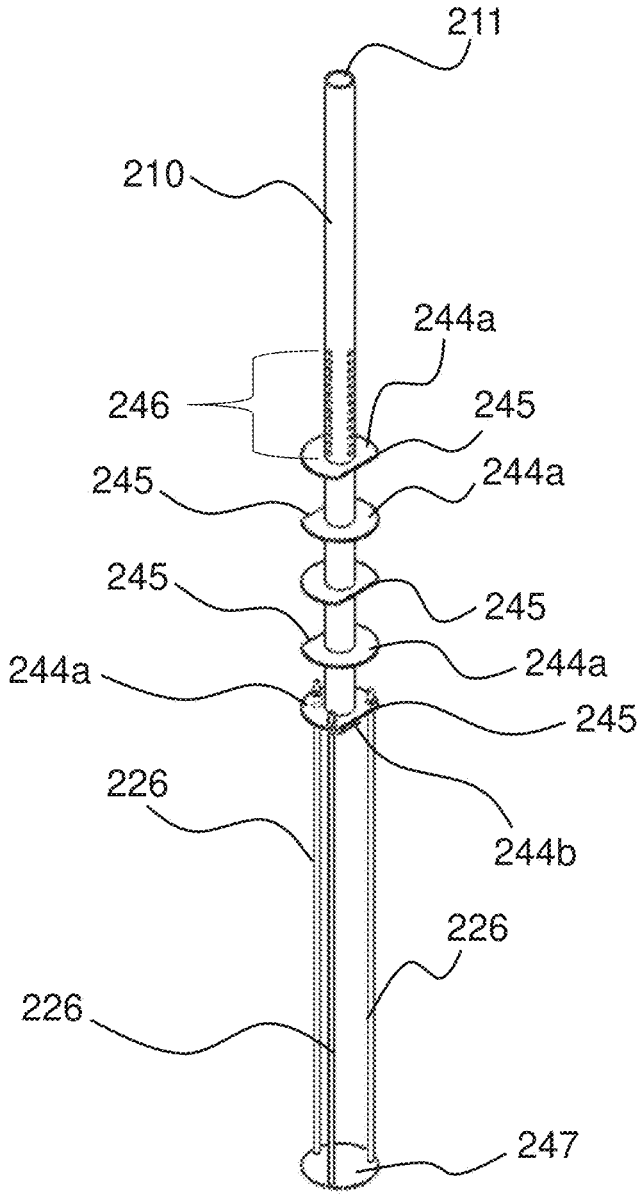
FIG. 2C is a perspective view of a portion of the reaction vessel 2A, shown with a container of the reaction vessel removed.

For example, referring now to FIGS. 2A-2C, a reaction vessel 202 may be alternatively used in place of any one or more of the plurality of reaction vessels 102*a,b,c,d*. The reaction vessel 202 may include a container 208, a conduit 210, and a plurality of baffles 244*a,b* (collectively referred to as the plurality of baffles 244*a,b* and separately referred to as a plurality of fixed baffles 244*a* and a check valve 244*b*). The container 208 may have a first end portion 214 and a second end portion 115, with a volume 216 defined therebetween. The conduit 210 may define an orifice 211 outside of the container 208 and spaced away from the first end portion 214 of the container 208. The orifice 211 may be in fluid communication with the volume 216. At least a portion of the conduit 210 may extend into the volume 216, where the plurality of baffles 244a,b are supported on the conduit 210, with the plurality of baffles 244a,b spaced away from the second end portion 115 of the container 208.

Collectively, the plurality of baffles 244a,b supported in the volume 216 intersect any instance of a longitudinal axis "LL" extending through the volume 216 from the first end portion 214 to the second end portion 215 of the container 208. For the sake of illustration, the longitudinal axis "LL" is depicted as centered in the volume 216. However, it shall be appreciated that, at any position parallel to the position of the longitudinal axis "LL" depicted in the volume 216, the longitudinal axis "LL" intersects the plurality of baffles 244a,b. Stated differently, all material moving between the conduit 110 and the second end portion 115 of the container 108 in the volume 116 may be deflected by at least a portion of the plurality of baffles 244a,b.

Each one of the plurality of fixed baffles 244a may include a chordal cut 245 such that the chordal cut 245 of each one of the plurality of fixed baffles 244a and the container 208 define at least a portion of a flow path in the volume 216 between the first end portion 214 and the second end portion 215. For example, the chordal cut 245 of one of the plurality of fixed baffles 244a may be radially offset from the chordal cut 245 of each of the other ones of the plurality of fixed baffles 244a such that the flow path past the fixed baffles 244a imparts swirl to hydrogen-containing gas moving from the second end portion 215 to the conduit 210 via the plurality of fixed baffles 244a.

To facilitate introduction of reactants to the portion of the volume 216 along the second end portion 215 of the container 208, the plurality of baffles 244a,b may include a check valve 244b in fluid communication with the orifice 211. The check valve 244b may be biased to a closed position to interrupt fluid communication between the orifice 211 and the portion of the volume 216 along the second end portion 215 of the container 208. Water and activated aluminum may be introduced into the conduit 210 through the orifice 211. As these reactants fall onto the check valve 244b, the check valve 244b may move into the portion of the volume 216 along the second end portion 215 of the container 208. Once the reactants are past the check valve 244b, the bias in the check valve 244b may return the check valve to the closed position such that hydrogen-containing gas produced by the reactants is forced to move along the flow path at least partially defined by the fixed baffles 244a.

In certain implementations, the portion of the conduit 210 in the volume 216 may define a plurality of holes 246 in fluid communication between the orifice 211 of the conduit 210 and the portion of the volume 216 along the second end portion of the container 208. As hydrogen-containing gas that has risen through the flow path at least partially defined by fixed baffles 244a may move into the conduit 210 via the plurality of holes 246 and may continue to rise in the conduit 210 to issue, ultimately, from the reaction vessel 202 via the orifice 211. Thus, as may be appreciated, the plurality of baffles 244a,b separate flows reactants and reaction products. In doing so, the flow path for hydrogen-containing gas may be oriented independently of considerations associated with inadvertent accumulation of reactants along the flow path for hydrogen-containing gas.

In certain implementations, the reaction vessel 202 may include a plurality of rods 226 supporting the plurality of baffles 244a,b and the conduit 210 in the volume 216. Additionally, or alternatively, the reaction vessel 202 may include an endplate For example, a plurality of rods 226 may support the plurality of baffles 244a,b in the volume 216. In certain implementations, the plurality of rods 226 may be coupled to an endplate 247 such that the conduit 210, the plurality of baffles 244a,b, the plurality of rods 226, and the endplate 247 form an assembly that may be removed from the container 208 as a single unit, to facilitate assembly and/or repair and replacement. The endplate 247 may be disposed along the second end portion 215 of the container 208 with a seal 248 between the endplate 247 and the second end portion 215 of the container 208. The seal 248 may include, for example, vacuum grease and/or an O-ring to reduce the likelihood of pressure getting under the endplate 247.

Having described various aspects of hardware within reaction vessels to reduce contaminants in hydrogen produced from water-reactive aluminum, attention is now directed to thermal management of reaction vessels to reduce such contaminants. Unless otherwise specified or made clear from the context, it shall be understood that any one or more of the following thermal management techniques may be used in addition to or instead of any one or more of the foregoing contaminant management techniques. Thus, for the sake of clear and efficient description, a single reaction vessel is described in each case. It shall be understood, however, that multiple instances of such reaction vessels may be coupled together as described herein.

Figure 3:
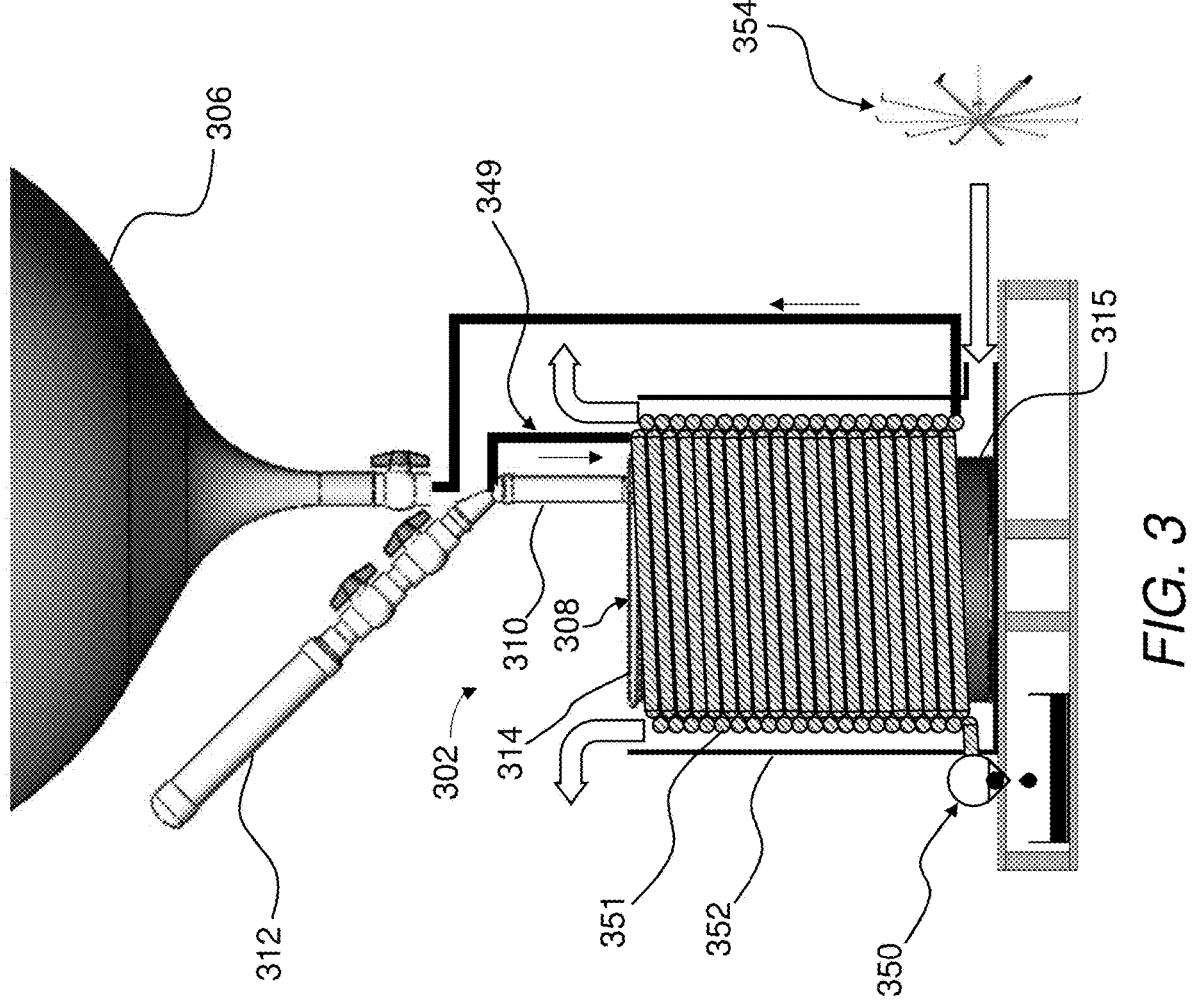
FIG. 3 is a schematic representation of a system having a reaction vessel including a container, a condenser disposed about the container, a shroud circumscribing at least a portion of the condenser, a float valve in fluid communication with the condenser, and an air mover arranged to direct air over the condenser.

Referring now to FIG. 3, a reaction vessel 302 may include a container 308, a conduit 310, a cannister 312, a condenser 349, and a float valve 350. The container 308 may have a first end portion 314 and a second end portion 315, and the container 308 may define a volume therebetween (e.g., the volume 116 of the container 108 described above with respect to FIG. 1B). The conduit 310 may define an orifice 311. At least a portion of the conduit 310 may extend outside of the container 308 with the orifice 311 spaced away from the first end portion 314 of the container 308. The cannister 312 may define a fluid-tight compartment (e.g., the compartment 136 of the cannister 135 described above with respect to FIG. 1C). The cannister 312 may be actuatable, according to any one or more of the various different techniques herein, to release water-reactive aluminum from into the container 308 via the orifice 211. The condenser 349 may be in fluid communication with the volume of the container 308 via the conduit 310 such that hydrogen-containing gas formed in the container 308 according to any one or more of the various different techniques described herein may be cooled in the condenser 349. The float valve 350 may be arranged relative to the condenser 349 (e.g., below the condenser 349) to receive condensation from the condenser 349. Advantageously, because the float valve 350 releases the condensed water that has collected only after the water is at a predetermined depth within a reservoir of the float valve 350, the water may be released from the float valve 350 without releasing hydrogen-containing gas from the float valve 350. That is, as the float valve 350 opens to release water, the water in the reservoir of the float valve 350 may remain between hydrogen-containing gas and the open float valve 350 such that the water in the reservoir of the float valve 350 substantially limits (e.g., prevents) the hydrogen-containing gas from escaping through the float valve 350.

In certain implementations, the condenser a plurality of coils 351 about the container 308. For example, the plurality of coils 351 may be concentrically wrapped about the container 308 to facilitate achieving substantially uniform cooling about the container 308. Additionally, or alternatively, the plurality of coils 351 may be sloped downward toward the float valve 350 such that condensation in the plurality of coils 351 may move toward the float valve 350 under the force of gravity. As hydrogen-containing as enters the condenser 349 from the container 308, the hydrogen-containing gas may move through the plurality of coils 351 in a direction from the first end portion 314 toward the second end portion 315. As the hydrogen-containing gas moves through the plurality of coils 351, the hydrogen-containing gas may cool to a temperature sufficient to condense water content from the hydrogen-containing gas and toward the float valve 350. The nominally dry hydrogen-containing gas may then move from the condenser 349 to an inflatable structure 306 or another end-use that may be sensitive to the presence of water (e.g., a fuel cell).

In certain implementations, the reaction vessel 302 may include a shroud 352 and an air mover 354. The shroud may circumscribe at least a portion of the plurality of coils 351 of the condenser 349. The air mover 354 may be, for example, one or more of a fan or a blower and may be arranged to move air over the plurality of coils 351 in a space between the shroud 352 and the air mover 354 to cool the plurality of coils 351 using forced convection.

While such forced convection may include the use of the shroud 352, it shall be appreciated that certain implementations of forced convection of the plurality of coils 351 may be achieved without the shroud 352. Further, or instead, while the plurality of coils 351 may be cooled using forced convection in some cases, it shall be understood that the plurality of coils 351 may be cooled using natural convection in other cases.

Figure 4:
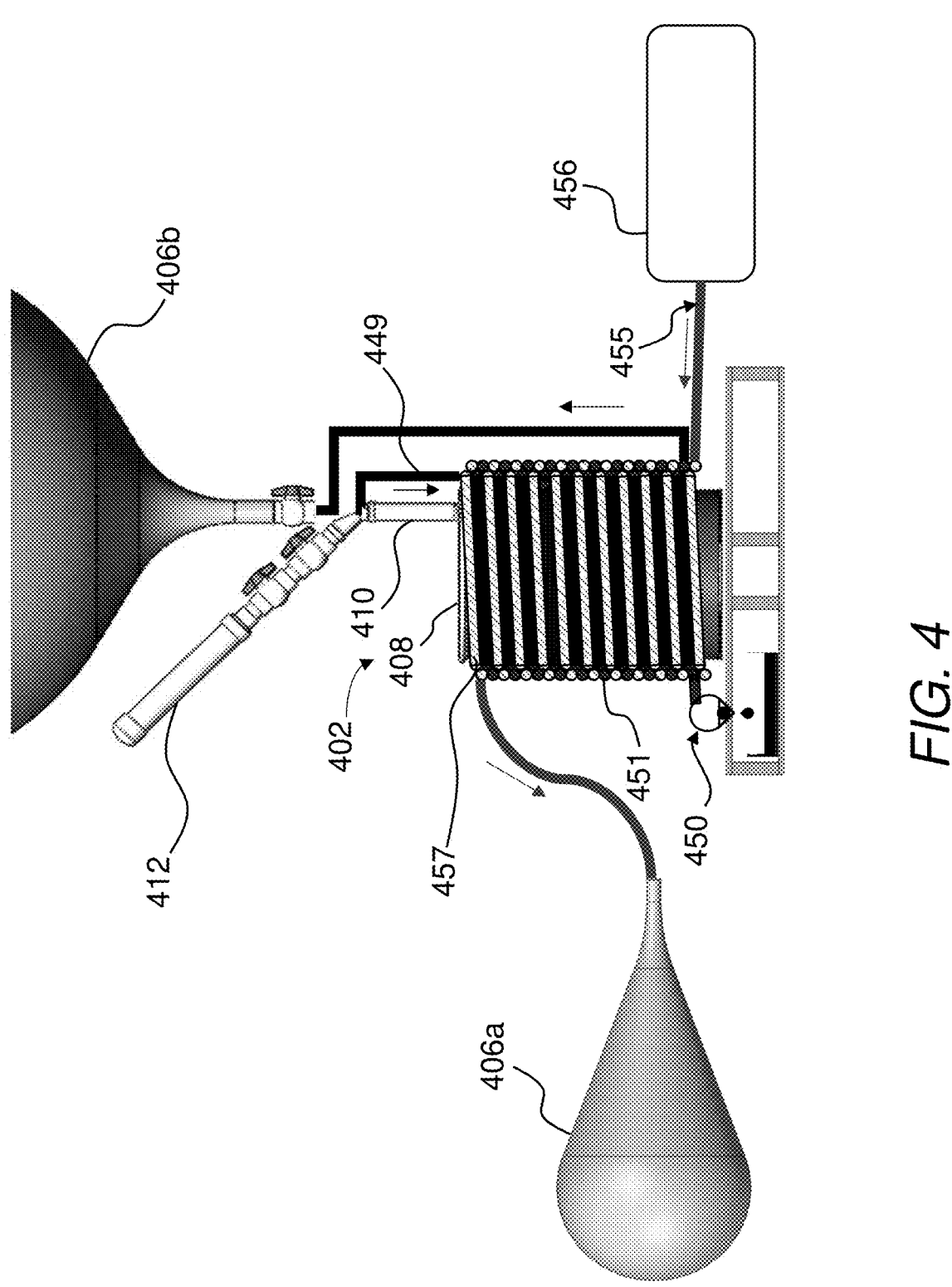
FIG. 4 is a schematic representation of a system including a first inflatable structure, a second inflatable structure, a reaction vessel, a condenser, an auxiliary tank, and a heat exchanger in thermal communication between the condenser and the auxiliary tank.

Referring now to FIG. 4, a reaction vessel 402 may include a container 408, a conduit 410, a cannister 412, a condenser 449, a heat exchanger 455, a float valve 450, and an auxiliary tank 456. The auxiliary tank 456 may be in fluid communication with a first plurality of coils 451 of the condenser 449 via the heat exchanger 455. The auxiliary tank 456 may be selectively actuatable to direct pressurized hydrogen from the auxiliary tank 456 to a first inflatable structure 406a in fluid communication with the heat exchanger 455. As the pressurized hydrogen from the auxiliary tank 456 expands in the heat exchanger 455, the expansion of the hydrogen will cool the heat exchanger 455 and, thus, cool hydrogen-containing gas moving through the first plurality of coils 451 of the condenser 449 from the container 408. In turn, such cooling may condense at least a portion of the water content from the hydrogen containing gas moving through the first plurality of coils 451, where the condensation may collect in the float valve 450. The nominally dry hydrogen-containing gas may then move from the first plurality of coils 451 into a second inflatable structure 406b in fluid communication with the first plurality of coils 451.

In certain implementations, the heat exchanger 455 may include a second plurality of coils 457 in contact with the first plurality of coils 451 with opposing flows in each set of coils to facilitate achieving uniform temperature along the container 408. With the first plurality of coils 451 nested with the second plurality of coils 457, the temperature of the sets of coils will toward equilibration. That is, hot steam in the first plurality of coils 451 may condense into water and the cold hydrogen gas in the second plurality of coils 457 may warm to reduce the likelihood of blockage.

While condensers have been described as providing cooling to hydrogen-containing gas, it shall be appreciated that other cooling techniques may be additionally or alternatively used to cool hydrogen-containing gas formed from water-reactive aluminum.

Figure 5:
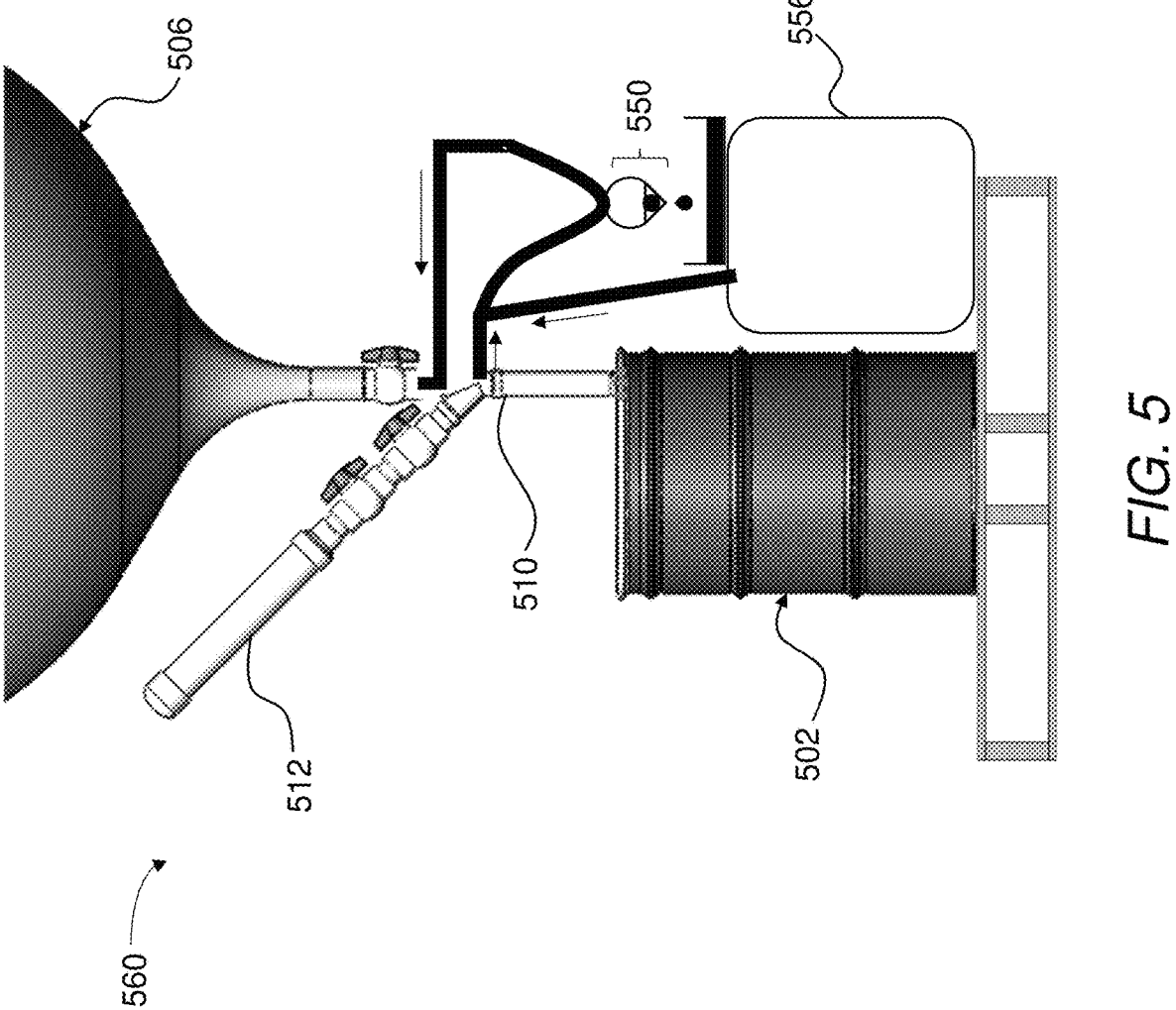
FIG. 5 is a schematic representation of a system including an inflatable structure, a reaction vessel, and an auxiliary tank, with the reaction vessel and the auxiliary tank each in fluid communication with the inflatable structure.

For example, referring now to FIG. 5, a system 560 may include a reaction vessel 502, a conduit 510, a canister 512, float valve 550, and an auxiliary tank 556. Activated aluminum from the canister 512 may be reacted in the reaction vessel 502 to produce hydrogen-containing gas. The auxiliary tank 556 may be in fluid communication with the flow of hydrogen-containing gas moving from the conduit 510 toward an inflatable structure 506. The auxiliary tank 556 may be actuatable to release pressurized hydrogen into a mixture with the hydrogen-containing gas moving from the conduit 510. As the pressurized hydrogen from the auxiliary tank 556 expands, it may cool the hydrogen-containing gas moving from the conduit 510 toward the inflatable structure 506 such that at least a portion of the water content of the hydrogen-containing gas may condense and collect in the float valve 550 before flowing into the inflatable structure 506.

Figure 6:
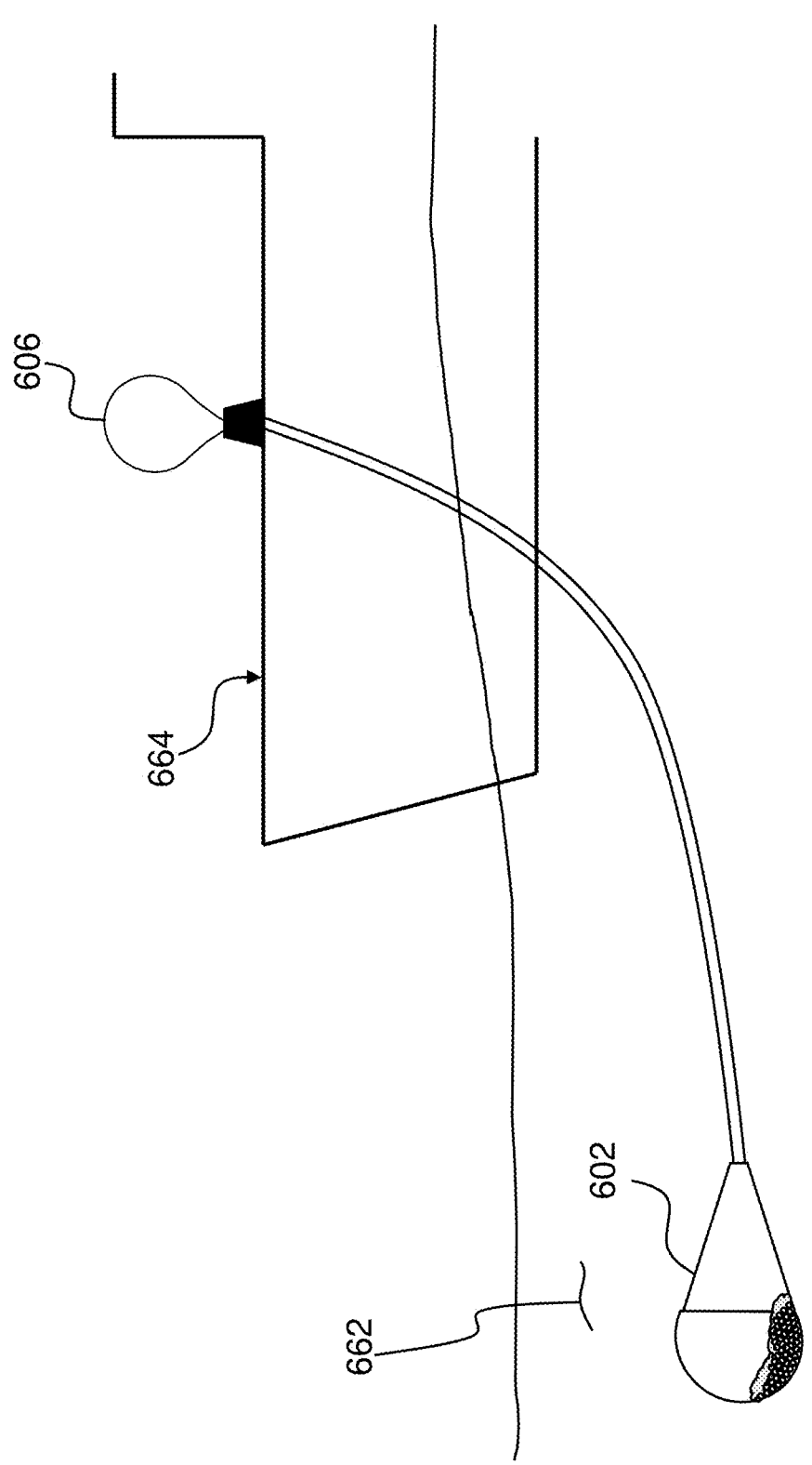
FIG. 6 is a schematic representation of a system including a reaction vessel immersed in a body of water and directing hydrogen-containing gas to an inflatable structure.

Referring now to FIG. 6, a reaction vessel 602 may be cooled in a large body of water 662. For example, the reaction vessel 602 may be hung in the body of water 662 from the side of a ship 664. In some instances, activated aluminum in the reaction vessel 602 may react with water from the body of water 662 (e.g., seawater) to produce hydrogen. The body of water 662 also provides cooling to the reaction vessel 602 and the hydrogen containing gas produced in the reaction vessel such that a significant portion of steam in the hydrogen containing gas may condense before reaching an end use, such as an inflatable structure 606 supported on the ship 664 (e.g., on the deck of the ship). As an example, the reaction vessel 602 may be a flexible bag reaction chamber that may expand as it is filled with hydrogen-containing gas. For example, the reaction vessel 602 may be formed of rubber and/or one or more polymeric materials.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A reaction vessel for forming hydrogen-containing gas from activated aluminum, the reaction vessel comprising:

a container including a first end portion and a second end portion, the container defining a volume from the first end portion to the second end portion, wherein the container is a bag;

a conduit fluidically coupled to the volume via the first end portion of the container; and a plurality of structures disposed within the volume, the plurality of structures elongate in a direction from the second end portion to the first end portion of the container, and the plurality of structures and the container defining, within the volume, at least a portion of a non-linear flow path from the second end portion of the container to the conduit.

2. The reaction vessel of claim 1, wherein the first end portion and the second end portion define a longitudinal axis, and the container is symmetric about the longitudinal axis.

3. The reaction vessel of claim 2, wherein the longitudinal axis extends through the conduit, and at least a portion of the plurality of structures intersects the longitudinal axis within the volume.

4. The reaction vessel of claim 1, wherein the plurality of structures include a plurality of rods extending, within the volume, from the second end portion to the first end portion of the container.

5. The reaction vessel of claim 1, wherein at least one of the plurality of structures is adjustable within the volume.

6. The reaction vessel of claim 1, wherein the plurality of structures include at least one baffle intersecting a longitudinal axis defined from the first end portion to the second end portion of the container.

7. The reaction vessel of claim 6, wherein the at least one baffle defines a plurality of orifices.

8. The reaction vessel of claim 1, wherein the plurality of structures are adjustable relative to one another in the volume.

9. The reaction vessel of claim 1, wherein a dimension of the volume from the first end portion to the second end portion of the container is a maximum dimension of the volume.

10. The reaction vessel of claim 1, wherein the container is rigid under temperatures and pressures associated with generating hydrogen containing gas from reaction of activated aluminum with water.

* * * * *